United States Patent [19]

Loffler

[11] Patent Number: 4,783,212
[45] Date of Patent: Nov. 8, 1988

[54] MOULD ARRANGEMENT FOR USE IN A CYCLICLY OPERATING GLASSWARE FORMING MACHINE

[75] Inventor: Werner Loffler, Kleintettau, Fed. Rep. of Germany

[73] Assignee: Emhart Industries, Inc., Farmington, Conn.

[21] Appl. No.: 936,914

[22] Filed: Nov. 26, 1986

Related U.S. Application Data

[63] Continuation of Ser. No. 689,129, Jan. 7, 1985, abandoned.

[30] Foreign Application Priority Data

Jan. 12, 1984 [GB] United Kingdom ................ 8400772

[51] Int. Cl.⁴ ........................... C03B 9/14; C03B 9/20; C03B 9/38
[52] U.S. Cl. ........................................ 65/265; 65/267; 65/356
[58] Field of Search ................. 65/162, 269, 267, 319, 65/355, 356

[56] References Cited

U.S. PATENT DOCUMENTS

| | | | |
|---|---|---|---|
| 3,094,404 | 6/1963 | Lauck | 65/319 |
| 3,586,491 | 6/1971 | Mennitt | 65/265 |
| 3,617,232 | 11/1971 | Goodwin | 65/267 |
| 4,251,253 | 2/1981 | Becker et al. | 65/267 |
| 4,388,099 | 6/1983 | Hermening et al. | 65/267 |
| 4,657,573 | 4/1987 | Jones | 65/356 |

FOREIGN PATENT DOCUMENTS 0102820 3/1984 European Pat. Off. .

Primary Examiner—David L. Lacey
Assistant Examiner—Michael K. Boyer
Attorney, Agent, or Firm—Spencer T. Smith

[57] ABSTRACT

The mould of the mould arrangement comprises a bottom plate and two side portions which are movable to a first position in which they engage one another and the bottom plate to define a mould cavity and to a separated position. The side portions define cooling passages having entrances in bottom surfaces of the side portions and the bottom plate has at least one plenum chamber formed therein which has exits which, when the side portions are in their first position, communicate with cooling passage entrances so that air blown into the plenum chamber passes through the cooling passages. A bottom plate for the arrangement is also disclosed.

5 Claims, 3 Drawing Sheets

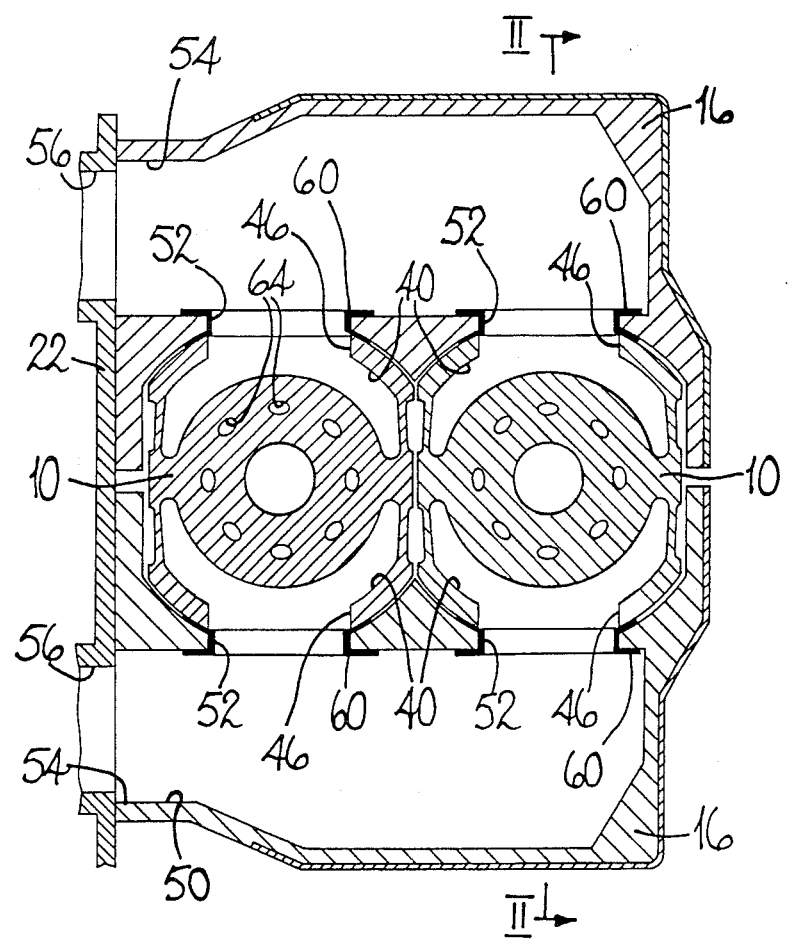
Fig_1

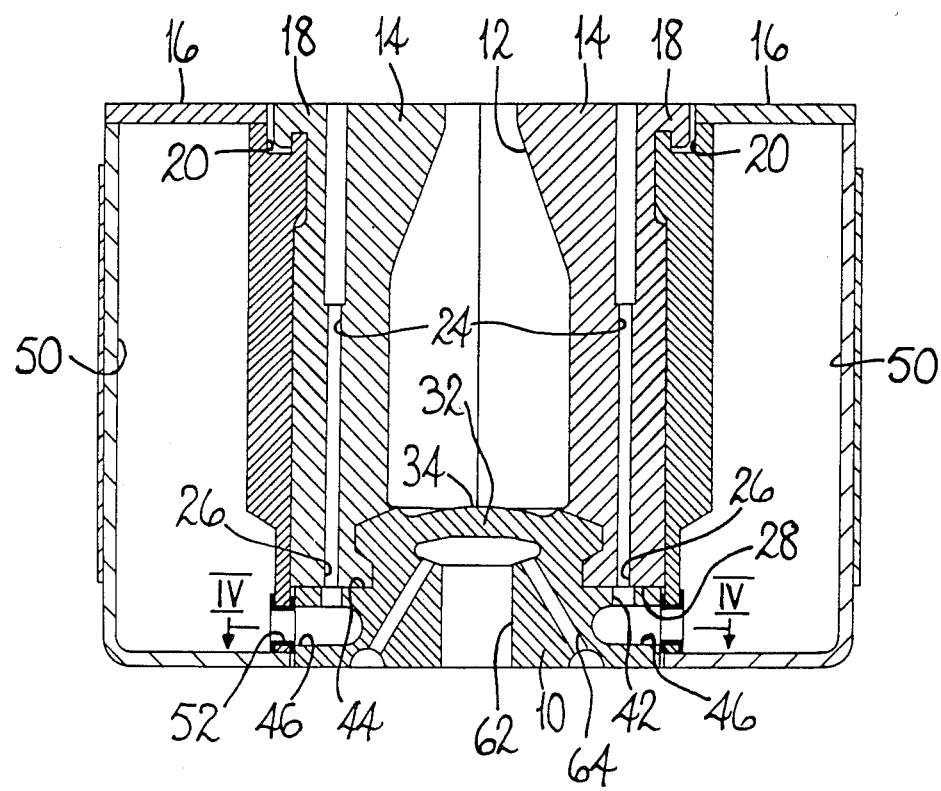
Fig_2

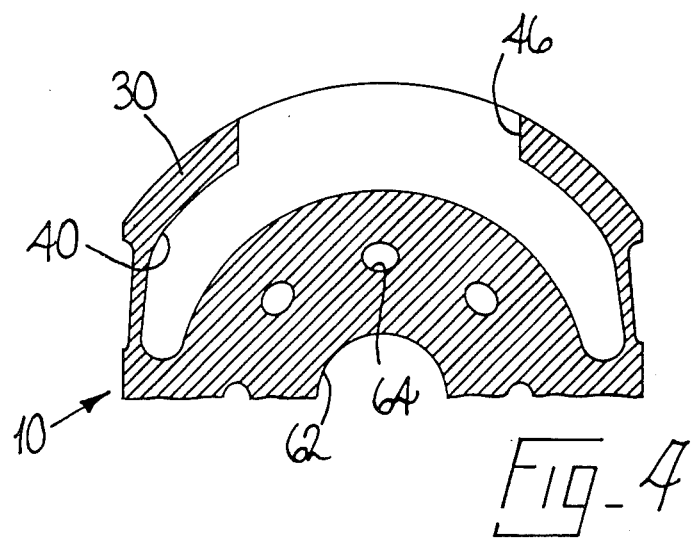
Fig_4
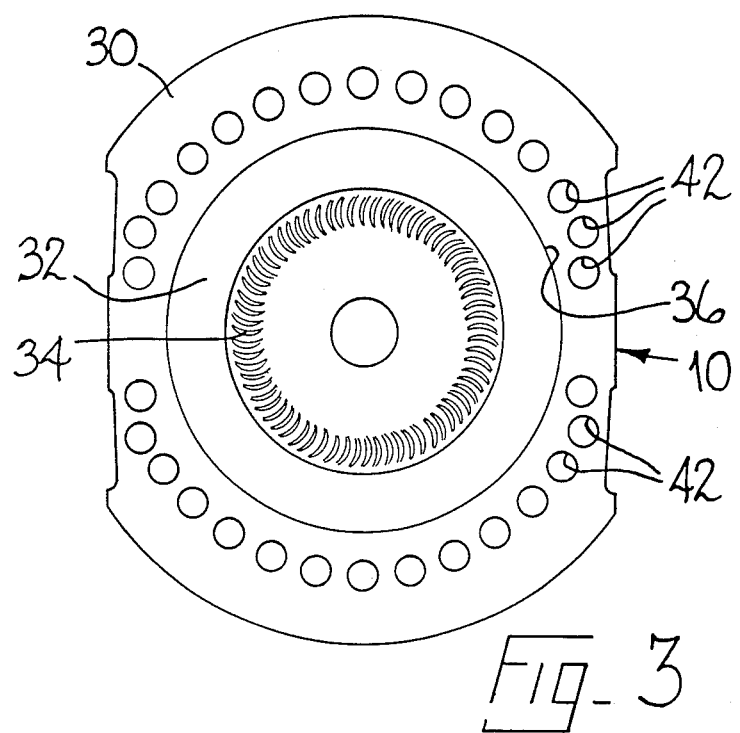
Fig_3

MOULD ARRANGEMENT FOR USE IN A CYCLICLY OPERATING GLASSWARE FORMING MACHINE

This is a continuation of application Ser. No. 689,129 filed on Jan. 7, 1985 now abandoned.

BACKGROUND OF THE INVENTION

This invention is concerned with a mould arrangement for use in a cyclicly operating glassware forming machine, the arrangement comprising a mould comprising a bottom plate defining a bottom portion of a cavity of the mould in which molten glass is moulded in the operation of the machine, and two side portions defining side portions of the cavity, each side portion being movable, in a cycle of operation of the machine, to a first position thereof, in which it engages the bottom plate and the other side portion to co-operate in defining the mould cavity so that moulding can take place, and to a second position thereof, in which the side portions are separated to allow moulded glass to be removed from the mould cavity, the side portions also defining cooling passages through which air can pass to cool the side portions, each cooling passage having an entrance in a bottom surface of a side portion and passing upwardly through that side portion.

The invention is also concerned with a bottom plate for a mould arrangement for use in a cyclicly operating glassware forming machine, the plate comprising a base portion and a central portion which projects upwardly from the base portion, the central portion having an upper surface arranged to define a bottom portion of a mould cavity and side portions which form recesses arranged to receive complementarily-shaped portions of side portions of a mould which are arranged to define side portions of the mould cavity and are movable, in a cycle of operation of the machine, to a first position thereof, in which they engage the bottom plate and each other to co-operate in defining the mould cavity so that moulding can take place, and to a second position thereof, in which the side portions are separated to allow moulded glass to be removed from the mould cavity, the side portions also defining cooling passages through which air can pass to cool the side portions, each cooling passage having an entrance in a bottom surface of a side portion and passing upwardly through that side portion.

In a glass container manufacturing machine of the so-called "individual section" type, a number of container making units or sections are arranged side by side, are fed with glass from a common source, and feed their output to a common conveyor. Each of these sections has at least one parison mould in which a parison is formed from a gob of molten glass delivered to the mould, and at least one blow mould in which parisons are blown to the shape of the container. The blow mould forms part of a mould arrangement as described above and comprises a bottom plate as described above.

Since the moulds of an individual section type machine absorb heat from the glass at a rate which is faster than the heat can be dissipated to the surrounding atmosphere without additional cooling, such moulds are supplied with cooling means which cool the mould so that it remains at a substantially constant average temperature during successive operations of the machine. Because the sections of an individual section type machine need to be close together, for reasons of glass supply, only very limited space is available around the mould for the provision of cooling means. One solution to this problem is to feed cooling air through the frame of the machine section to a vertical cooling stack which is provided with nozzles which direct the air on to the outside of the mould. This solution, however, has the disadvantage that the supports supporting the side portion of the mould interfere with the flow of air to the mould and also that it is difficult to provide differential cooling around the mould as is desirable. Furthermore, such cooling stacks are a source of undesirable noise. In another type of cooling means, cooling air is supplied through the supports of the side portions of the mould to a chamber around the mould. This type has the disadvantage that a seal has to be provided between the supports and the side portions of the mould, causing delays in changing moulds and increasing the cost of the mould. It is also difficult to provide differential cooling around the mould. Attempts have also been made to cool moulds by passing cooling air through passages in the side portions thereof. Examples can be found in U.K. Patent Specification No. 1,337,292 and U.S. Pat. No. 4,251,253 (FIGS. 10 to 12). In these arrangements, pipe connections are involved between the supports and the mould portions thereby causing delay to mould changes and increasing the cost of the moulds. Furthermore, in these arrangements, the cooling air makes sharp changes of direction in the mould so that considerable resistance to air flow is created requiring the use of high pressure air to achieve adequate flow. The use of high pressure air is undesirable because of the expense involved. Furthermore non-uniform air flow is created distorting the cooling effect and making it difficult to predict. Thus, it becomes difficult to predict where to position the cooling passages to achieve the optimum cooling effect. If the passages are not initially correctly positioned, the cooling effect can be adjusted by inserting plugs or insulating sleeves into the passages but this is a time-consuming trial-and-error method because the effects of the plugs and/or sleeves are again hard to predict.

In the specification of European Patent Application No. 83304985.1 (Publication No. 0102820), there is described a mould arrangement in which a plenum chamber extends beneath the first or the second position of each side portion of the mould and has one or more exits which open upwardly and communicate, when the side portion is above the plenum chamber, either directly or through vertical passages in the bottom plate with the entrances of the cooling passages in the side portions so that air is supplied to each cooling passage at substantially the same pressure, the plenum chamber also having an entrance connected to air supply means operable to blow air into the plenum chamber. This arrangement provides cooling means in which the above-mentioned disadvantages of previous cooling means are overcome. However, this mould arrangement is not applicable to existing bottom plate supporting mechanisms, requiring replacement of said mechanism by a mechanism of a different design.

It is an object of the present invention to provide a mould arrangement in which the advantages of the arrangement described in the aforementioned European Patent Specification are achieved and in which an existing bottom plate supporting mechanism can be used.

BRIEF SUMMARY OF THE INVENTION

The invention provides a mould arrangement for use in a cyclicly operating glassware forming machine, the arrangement comprising a mould comprising a bottom plate defining a bottom portion of a cavity of the mould in which molten glass is moulded in the operation of the machine, and two side portions defining side portions of the cavity, each side portion being movable, in a cycle of operation of the machine, to a first position thereof, in which it engages the bottom plate and the other side portion to co-operate in defining the mould cavity so that moulding can take place, and to a second position thereof, in which the side portions are separated to allow moulded glass to be removed from the mould cavity, the side portions also defining cooling passages through which air can pass to cool the side portions, each cooling passage having an entrance in a bottom surface of a side portion and passing upwardly through that side portion, wherein the mould arrangement also comprises at least one plenum chamber formed in the bottom plate and, when the side portions are in their first position, extending beneath the entrances of the cooling passages in at least one of the side portions, the plenum chamber having one or more exits which open upwardly and, when the side portions are in their first position, communicate with the entrances of the cooling passages in the side portion, and an entrance connected to air supply means operable to blow air into the plenum chamber.

In a mould arrangement according to the last preceding paragraph, air reaches the entrance of each of the cooling passages at substantially the same pressure, this being ensured by the plenum chamber. The term "plenum chamber" where used herein refers to a chamber whose exit or exits are sufficiently remote from its entrance and whose volume is sufficiently large that a substantially uniform pressure is created across the exit or exits of the chamber. Furthermore, the straight flow paths for the cooling air reduces the non uniform air flow to a minimum. Accordingly, it is possible to predict accurately the cooling effect of each passage on the distribution of cooling around the cavity can be controlled by positioning of the passages as determined by mathematical models constructed to obtain an optimum cooling distribution. Furthermore, the flow of cooling air is not interfered with by the supports supporting the side portions of the mould. The bottom plate of the mould arrangement can also be mounted on a conventional bottom plate supporting mechanism since the plenum chambers are formed in the bottom plate itself and not beneath or around the bottom plate.

The passages in the side portions of the mould may be formed by bores through the side portions themselves or by spaces between fins of the side portions, in which case, the open side of the space may be closed by an external jacket attached to the side portion to prevent air escaping from the passage.

Conveniently, there are two plenum chambers formed in the bottom plate, each extending beneath the entrances of the cooling passages in one of the side portions, when the side portions are in their first position, and having one or more exits which open upwardly and, when the side portions are in their first position, communicate with the entrances of the cooling passages in one of the side portions, and an entrance connected to air supply means operable to blow air into the plenum chamber. This arrangement enables the air flow to be made more uniform.

Conveniently, where there are two plenum chambers, the side portions of the mould are mounted on movable supports each of which defines a chamber into which the air supply means is arranged to blow air, each chamber having an exit which is arranged, when the side portions are in their first position, to communicate with the entrance of one of the plenum chambers. In this way, the air supply is brought to the plenum chambers in a convenient manner. The chambers of the movable supports may have a plurality of exits, each arranged, when the side portions are in their first position, to communicate with an entrance of a plenum chamber of one to a plurality of bottom plates mounted side by side.

In order to achieve better control of the cooling by enabling the cooling period to be varied, and also to prevent the unnecessary escape of air when the side portions of the mould are in the second position and the exits of the chambers in the movable supports do not communicate with the plenum chamber or chambers; the mould arrangement may comprise valve means operable to cause cooling air to enter the plenum chamber of chambers for a predetermined time in each cycle of operation of the machine.

In order to enable low pressure air to be used, each cooling passage may extend substantially in a straight line between its entrance and an exit thereof to atmosphere so that the mass flow of air in the passage is determined by the cross-sectional area and length of the passage and entrance and exit configurations thereof. The air supply means may be arranged to create a pressure of up to 2 lbs per square inch (1400 mm of water) at the exits of the plenem chambers.

The invention also provides a bottom plate for a mould arrangement for use in a cyclicly operating glassware forming machine, the plate comprising a base portion and a central portion which projects upwardly from the base portion, the central portion having an upper surface arranged to define a bottom portion of a mould cavity and side portions which form recesses arranged to receive complementarily-shaped portions of side portions of a mould which are arranged to define side portions of the mould cavity and are movable, in a cycle of operation of the machine, to a first position thereof, in which they engage the bottom plate and each other to co-operate in defining the mould cavity so that moulding can take place, and to a second position thereof, in which the side portions are separated to allow moulded glass to be removed from the mould cavity, the side portions also defining cooling passages through which air can pass to cool the side portions, each cooling passage having an entrance in a bottom surface of a side portion and passing upwardly through that side portion, wherein the base portion defines at least one plenum chamber arranged to extend beneath the entrances of the cooling passages of at least one of the side portions, when the side portions are in their first position, the plenum chamber having one or more exits which open upwardly through an upper surface of the base portion surrounding the central portion and are arranged, when the side portions are in their first position, to communicate with entrances of the cooling passages in the side portion, the plenum chamber also having an entrance arranged to be connected to air supply means operable to blow air into the plenum chamber.

Conveniently, the base portion defines two plenum chambers each arranged to extend beneath the entrances of the cooling passages of one of the side portions, when the side portions are in their first position, each plenum chamber having one or more exits which open upwardly through an upper surface of the base portion surrounding the central portion and are arranged, when the side portions are in their first position, to communicate with the entrances of the cooling passages in the side portion, each plenum chamber also having an entrance arranged to be connected to air supply means operable to blow air into the plenum chamber.

Conveniently, where there are two plenum chambers in a bottom plate according to the last preceding paragraph the entrances of the two plenum chambers are formed in diametrically-opposed portions of the base portion and each plenum chamber brances away from its entrance into two branches which extend towards a position beneath the joining line of the two side portion of the mould when they are in their first position.

Conveniently, the base portion, of a bottom plate according to either one of the last two preceding paragraphs, is constructed from two pieces, a lower piece which defines bottom and side walls of the or each plenum chamber and an upper piece which defines upper walls of the plenum chambers.

BRIEF DESCRIPTION OF THE DRAWINGS

There now follows a detailed description, to be read with reference to the accompanying drawings, of a mould arrangement which is illustrative of the invention. It is to be understood that the illustrative mould arrangement has been selected for descriptive by way of example and not of limitation of the invention.

In the drawings:

FIG. 1 is a horizontal cross-sectional view of the illustrative mould arrangement, the view being taken at the level of the line IV—IV in FIG. 2;

FIG. 2 is a vertical cross-sectional view of the illustrative mould arrangement taken on the line II—II in FIG. 1;

FIG. 3 is a plan view of a bottom plate of the illustrative mould arrangement, on a larger scale; and FIG. 4 is a horizontal cross-sectional view taken on the line IV—IV in FIG. 2, but on a larger scale, of a portion of the bottom plate shown in FIG. 3.

DETAILED DESCRIPTION OF PREFERRED EMBODIMENT OF THE INVENTION

The illustrative mould arrangement is for use in a cyclicly operating glassware forming machine of the individual section type. The arrangement comprises a mould comprising a bottom plate 10 defining a bottom portion of a cavity 12 of the mould in which molten glass is moulded in the operation of the machine. The mould of the illustrative mould arrangement also comprises two side portions 14 defining side portions of the cavity 12. Each side portion 14 is mounted on a support 16 by means of a horizontally-projecting hook portion 18 of the side portion 14 projecting above an upwardly facing recess 20 of its support 16, a downward projection of the hook portion 18 being received in the recess 20. Each side portion 14 is movable, in a cycle of operation of the machine, by movement of the supports 16 in a well-known manner, to a first position thereof, in which it engages the bottom plate 10 and the other side portion 14 to co-operate in defining the mould cavity 12 so that moulding can take place (the side portions 14 are shown in their first position in FIG. 2). Each side portion 14 is also movable to a second position thereof, reached by moving the side portions away from one another, in which the side portions 14 are separated to allow moulded glass to be removed from the mould cavity 12.

In the illustrative mould arrangement, the supports 16 are movable linearly towards or away from one another on a slideway formed on a frame 22 of the machine but, in a modification of the illustrative mould arrangement, the supports 16 may be both pivoted for movement about a common vertical axis to move the side portions 14 between their first and their second positions.

The side portions 14 also define cooling passages 24 through which air can pass to cool the side portions 14. Each cooling passage is formed by a cylindrical bore passing vertically through the side portion 14 and has an entrance 26 in a bottom surface 28 of the side portion 14. Thus, each cooling passage 24 passes upwardly through the side portion 14. Upper portions of the cooling passages 24 are formed of larger diameter than the lower portions thereof to concentrate the cooling effect in the lower portions of the passages 24.

The bottom plate 10 of the illustrative mould arrangement comprises a base portion 30 and a central portion 32 which projects upwardly from the base portion 30. The base portion 30 is adapted to be mounted on a conventional bottom plate supporting mechanism of an individual section machine. The central portion 32 has an upper surface 34 which is arranged to define a bottom portion of the mould cavity 12 and side surfaces 36 which form recesses arranged to receive complementarily-shaped portions of the side portions 14 of the mould which are arranged to define the side portions of the mould cavity 12. Thus, when the side portions 14 are in their first position, the mould cavity 12 is defined by the side portions 14 and the surface 34.

The base portion 30 of the bottom plate 10 defines two plenum chamber 40 each arranged to extend beneath the entrances 26 of the cooling passages 24 of one of the side portions 14, when the side portions are in their first position. Each plenum chamber 40 has fifteen exits 42 which open upwardly through an upper surface 44 of the base portion 30 surrounding the central portion 32. There is one exit 42 for each cooling passage entrance 26 and the number of exits 42 may, if desired, be greater or less than fifteen. The exits 42 are arranged so that, when the side portions 14 are in their first position, they communicate with the entrances 26 of the cooling passages 24 in the side portion 14. In a modification of the illustrative mould arrangement, the fifteen exits 42 may be replaced by a single exit 42 from each plenum chamber 40 which is in the form of a slot occupying the area occupied by all fifteen of the exits 42.

Each plenum chamber 40 also has an entrance 46 arranged to be connected to air supply means operable to blow air into the plenum chamber 40. The arrangement is such that, when the side portions 14 are in their first position and air is blown into the plenum chambers 40, the air passes through the exits 42 and into the cooling passages 24. The entrances 46 of the two plenum chambers 40 of the bottom plate 10 are formed in diametricallyopposed portions of the base portion 30 and each plenum chamber 40 brances away from its entrance (see FIG. 4) into two branches which extend towards a position beneath the joining line of the two side portions of the mould, when they are in their first position. Although shown in the drawings as one piece, the base portion 30 may be constructed from two pieces, a lower piece which defines bottom and side walls of the plenum chambers 40 and an upper piece which defines upper walls of the plenum chambers 40 and supports the central portion 32. This arrangement gives the advantage that the exits 42 of the plenum chambers 40 can be radiused to increase the ease with which air can flow through the exits 42.

The side portions 14 of the mould of the illustrative mould arrangement are, as aforementioned, mounted on movable supports 16 and each of the supports 16 defines a chamber 50 into which the air supply means, which is formed by a fan (not shown) is arranged to blow air. Each chamber 50 has an exit 52 which is arranged, when the side portions 14 are in their position, to communicate with the entrance 46 of one of the plenum chambers 40. The chambers 50 receive air through entrances 54 thereof which, when the side portions 14 are in their first position, communicate with exits 56 from a chamber (not shown) within the frame 22 into which the fan of the air supply means is arranged to blow air.

Where the glassware forming machine is arranged to operate in the "double gob" mode in which two articles are formed simultaneously, as is the case with the illustrative mould arrangement, two bottom plates 10 are mounted side by side on the bottom plate support mechanism and two side portions 14 are supported by each support 16. In this case, the chambers 50 of the movable support 16 have a plurality, viz 2, of exits 52 each arranged when the side portions 14 are in their first position, to communicate with an entrance 46 of a plenum chamber 40 of one of the tow bottom plates 10.

The air supply means is arranged to create a pressure of up to 1400 mm of water at the exits 42 of the plenum chambers 40 and, as can be seen in the drawings, each cooling passage 24 extends substantially in a straight line between its entrance 28 and an exit thereof to atmosphere at the top of the side portion 14. Thus, the mass flow of air in the passages 24 is determined by the cross-sectional area and length of the passages 24 and entrance and exit configurations thereof rather than by any bends or restrictions in the passages 24.

In the operation of the illustrative mould arrangement, a parison is located above the bottom plate 10 while the side portions 14 are in their second position. The supports 16 then move the side portions into their first position so that the mould cavity 12 is formed around the parison. This movement brings the entrances 28 of the passages 24 into communication with the exits 42 of the plenum chambers of the bottom plates 10 and the entrance 54 of the chamber 50 into communication with the exit 56. Air is blown through the exit 56 into the chamber 50 and passes through the exit 52 into the entrance 46 of the plenum chamber 40. The plenum chamber 40 serves to equalise the pressure between its exits 42 and the air passes through the exits 42 and along the passages 24. A sealing member 60 is mounted on the support 16 in each of the exits 52 of the chamber 50 and serves to seal the gap between the bottom plate 10 and the support 16 around the entrance 46, when the side portions 14 are in their first position. The sealing member 60 is made of heat resistance resilient material and is retained on the support 16 by a flange thereof which surrounds the exit 52 of the chamber 50. Valve means (not shown) may be provided to open and close the exit 56 to cause cooling air to enter the plenum chambers 40 for a predetermined time in each cycle of operation of the machine so that the cooling effect can be closely controlled. While the side portions 14 are in first position, the parison is blown to the shape of the cavity 14. The side portions 14 are then moved to their second position to allow the blown article to be removed from the mould.

The bottom plate 10 also defines a central vacuum passage 62 through which air can be sucked in conventional manner and cooling passages 64 through which cooling air can pass through the bottom plate 10 if desired.

In a modification of the illustrative mould arrangement, the bottom plate defines only one plenum chamber which extends beneath both side portions of the mould, when they are in their first position, and has exits arranged to communicate with cooling passages in both side portions. Furthermore, the air supply means is connected to the entrance of the plenum chamber by means of a flexible hose instead of by the arrangement described above.

I claim:

1. A mould cooling arrangement for use in a glassware forming machine which includes a frame wall having at least one vertically extending exit opening for passage of cooling air, said mould arrangement comprising a mould including a bottom plate defining a bottom portion of a cavity of the mould in which molten glass is moulded in the operation of the machine, and two side portions defining side portions of the cavity, movable supports for supporting each said side portion for movement between a first position wherein the side portions are in engagement with the bottom plate and each other to define the cavity of the mould, and a second position wherein the side portions are spaced from each other to allow moulded glass to be removed, vertically extending cooling passages in each of said side portions through which air can pass to cool the side portions, each cooling passage having an entrance in a bottom surface of a side portion and passing upwardly through that side portion, at least one plenum chamber formed in said bottom plate and having a vertically extending entrance opening, said plenum chamber extending directly underneath the entrance of the cooling passages and having at least one upwardly opening exit which communicates with the entrance of the cooling passages when the side portions are in their first position, said movable supports each having walls which with said frame wall define, when the support is at said first position, an air chamber extending substantially from the top to the bottom of said mould, a vertically extending exit opening in said support walls which is in communication with the entrance opening of said plenum chamber when said side portions are in their first position and said exit opening in said frame comprising the air inlet to said chamber when the side portions are in their first position, whereby cooling air can pass through said frame and chamber to said plenum chamber and then to the cooling passages when said side portions are in their first position.

2. A mould cooling arrangement according to claim 1, wherein there are two plenum chambers formed in the bottom plate, each extending beneath the entrances of the cooling passages in one of the side portions, when the side portions are in their first position, and each having at least one exit which opens upwardly and, when the side portions are in their first position, communicate with the entrances of the cooling passages in one of the side portions and an entrance for communication with the exits in one of said supports.

3. A mould cooling arrangement according to claim 1, wherein the chambers of the movable supports have a plurality of exits each arranged, when the side portions are in their first position, to communicate with an entrance of a plenum chamber of one of a plurality of bottom plates mounted side by side.

4. A mould cooling arrangement according to claim 1, wherein each cooling passage has an exit to the atmosphere at the end opposite the entrance and extends substantially in a straight line between its entrance and exit so that the mass flow of air in the passage is determined by the cross-sectional area and length of the passage and entrance and exit configurations thereof.

5. A mould cooling arrangement according to claim 1 wherein said bottom plate includes a base portion and a upwardly projecting central portion having an upper surface defining a bottom portion of a mould cavity, said base portion having an upper surface positioned beneath the bottom surface of said side portions when said side portions are in their fist position, said at least one plenum chamber having at least one exit which opens upwardly through the upper surface of said base portion and communicates with the entrance of the cooling passages when said side portions are in their first position.

* * * * *